3,138,475
FILLER AND MATERIAL WITH AN ARTIFICIAL PEARLY GLOSS AND METHOD OF PRODUCING THE SAME
Hubert Schröder, Wiesbaden, and Reinhard Kaufmann, Mainz-Weisenau, Germany, assignors to Jenaer Glaswerk Schott & Gen., Mainz, Germany, a German corporation
Filed Nov. 4, 1960, Ser. No. 67,299
Claims priority, application Germany Nov. 14, 1959
7 Claims. (Cl. 106—291)

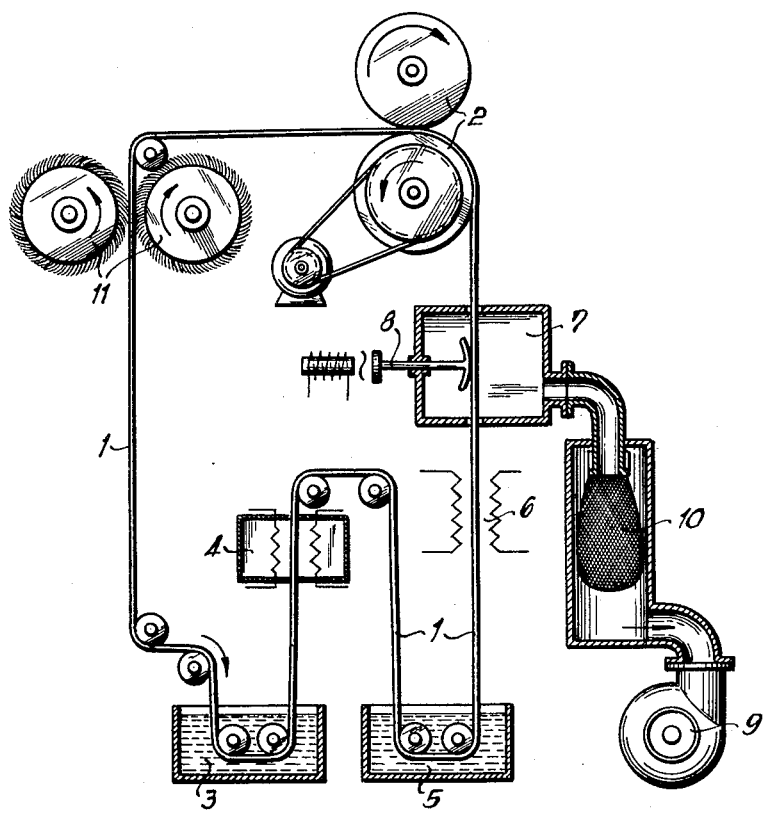

The present invention relates to a filler with an artificial pearly gloss, to a material in which such fillers are embedded, and to a method of producing such fillers.

Fillers with an artificial pearly gloss are already known for use in combination with carrier substances, for example, synthetic resins, for providing certain materials or articles with a gloss similar to that of mother-of-pearl. Such fillers are also used in cosmetics for producing the mentioned effect. However, there have so far been only very few proposals of methods for producing such fillers or of materials containing such fillers. Apart from natural products, for example, fish scales, lead carbonate has been used for this purpose which crystallizes by itself into thin scales or flakes and produces a comparatively strong light reflection because of its high index of refraction. When applying these small crystals, they are aligned in a transparent carrier substance, for example, a synthetic resin, and they then give the latter a glossy effect somewhat similar to that of mother-of-pearl. A disadvantage of these lead carbonate crystals is the impossibility of varying the glossy effect, for example, by changing its color. Another great disadvantage in the use of such lead carbonate crystals is their dangerous toxicity and easy decomposability.

It has also been proposed to draw out glass to form thin filmlike bands or strips and to break up these strips into scales, and to embed these scales, for example, into synthetic resins to serve as reflective substances. It is, however, very difficult to draw out a glass film to a thickness which is capable of producing an optical interference effect. For producing opalescent colors it is additionally necessary to carry out complicated coating processes.

It is an object of the present invention to provide fillers with an artificial pearly gloss which overcome the disadvantages of the known fillers of this type and consist of scales or flakes of oxides or hydrated oxides of at least trivalent metals, and which have a thickness, as seen in the direction vertical to the surface of the scales in the order of $1/10$ of a wave length up to several wave lengths, and at least some of which have an index of refraction $n_d$ of more than 1.60.

These fillers are nontoxic and their gloss or opalescence is produced by interference phenomena just as in natural mother-of-pearl, and they may be selected in accordance with the structure of the reflective elements.

A special advantageous effect will be attained according to the invention if at least a part of the flaky or scaly particles consists of several partial flakes which are disposed adjacent to each other with an optical contact between them and have alternately a higher and lower refraction. Depending upon the thickness of the individual flakes and depending upon the viewing angle, such flakes have, because of interference, a gloss of different colors, thus producing an iridescent effect.

The flakes or scales of a higher index of refraction are made according to the invention of oxides of titanium, iron, antimony, tin, thorium, and/or zirconium. The flakes of a lower refraction may consist primarily of $SiO_2$.

The oxide flakes may be embedded in many different kinds of carrier substances. They may, for example, be stirred into monomer synthetic resins which may then be polymerized, in which case the advantage will be attained that the little flakes have a relatively high stability of shape. The flakes may also be mixed with pastes, lacquers, or creamy or salvelike substances, for example, for cosmetic purposes, and, because of their high melting point, they may even be introduced into glass, provided its fusing temperature is not too high. A different manner of applying the iridescent flakes according to the invention consists in strewing or spraying them upon an object or applying them thereon like a paint so as to improve its surface qualities. If desired, the flakes may then also be more or less uniformly oriented, and the respective article may thereafter be coated with a suitable protective lacquer, synthetic resin, or a cover plate.

A particular advantage of the new type of pearly fillers consists in the simple manner in which they may be produced. The small oxide flakes may, according to the invention be produced as follows: First, a carrier consisting of a solid material, for example, glass, a ceramic mass, a metal, or a plastic, is moistened with a solution of a hydrolizable compound of the metal or metalloid which is to be transformed into the desired oxide so as to form a thin liquid coating thereon, from which during the subsequent heating the particular oxide or hydrated oxide is formed in a manner known as such in the form of a thin coating. This thin coating may be detached in the form of the mentioned flakes, scales, or the like by different procedures. If the coefficient of expansion of the carrier, for example, of a metal foil, differs considerably from that of the coating, the latter, when exceeding a certain thickness, for example, of about 0.2 to $2\mu$, depending upon the particular substance used, will when heated usually chip off by itself in the form of flakes. It is especially easy to detach the oxide flakes from their base if they consist of several superimposed layers of different substances. Thinner coatings may be removed from a nonmetallic base, for example, by previously providing the carrier with a coating which is adapted to reduce the adhesiveness of the oxide flakes, for example, with a coating of silicon enamel. Such coatings may also be of the type which decompose or evaporate when heated without separating any carbon, for example, hard waxes or similar materials. If the oxide layers are deposited upon flexible strips, for example, foils, the little flakes will also become detached when the strip is being bent or subjected to rhythmic vibrations, for example, by a shaking device which oscillates at the frequency of the main current supply.

The most economic manner of producing the oxide flakes is the continuous conveyor-belt method which is illustrated diagrammatically in the accompanying drawing together with the required apparatus.

As shown in the drawing, an endless conveyor belt 1 of plastic or metal which is adapted to receive a thin coating of liquid from which the hydrated oxide flakes are produced, is driven by cylinders 2 and, if required, it is first passed over rollers through a container 3 in which a very thin separating layer, for example, a silicon layer, is deposited on the belt to facilitate the subsequent detachment of the flakes from belt 1. After this layer has been solidified by passing the belt through a heating channel 4 in which a temperature of about 150° to 200° C. is maintained, the belt is passed through a coating bath 5 which contains a solution of the metal compound which is to be converted into oxide. A thin film-like coating is thus deposited on the separating layer and then dried while the moving belt passes through a heating stage 6 at a temperature of at least 100° C. When using a metallic or metallized belt, the heating process in heating stages 4 and 6 may also be carried out by induction.

For producing shiny flakes, the solution in coating bath 5 may have, for example, the following composition:

Example 1

1 mol of titanium tetrabutylate is diluted with alcohol to twice its volume and then saponified with 1.5 mols of water. For increasing the stability of the solution, a small amount of acid, for example, 10 cm.$^3$ of concentrated nitric acid is added thereto.

The heating in stage 6 is carried out to such an extent that already at this stage cracks will form in the coating, thereby initiating the subsequent scaling off of the oxide flakes. When the belt then passes into and through the suction chamber 7, a small shaking or impact movement by an impulse transmitter 8 will suffice to detach the flakes completely from the separating layer on the belt. This may also be carried out by revolving rollerlike brushes which are wiping along both surfaces of the belt. A suction pump 9 then draws the detached flakes into a collecting bag 10 which consists of a fabric of a sufficiently fine mesh to hold the flakes. During its return, belt 1 may, if necessary, be cleaned completely of any residues of the coating by passing through revolving brushes 11. Furthremore, before again passing into bath 3, the belt may also be passed through one or more cleansing baths, not shown in the drawing, in order to restore it to its original condition. If the flakes are to be produced from several superimposed coatings, the belt may, after passing through the first coating bath, be moved through one or more additional baths containing solutions of different metal or metalloid compounds which are adapted to form oxide layers. Of course, a heating stage should then be provided after each coating bath so that each coating will be dry before the next coating is applied. If this procedure is to be followed, the solution in bath 5 should be diluted to such an extent that the flakes will not as yet start to detach from the belt when the latter passes through heating stage 6. A second coaing bath subsequent to heating stage 6 which follows the first bath 5 may have, for example, the following composition:

Example 2

2 parts by volume of ortho-silicic acid methyl ester are diluted with 5 parts of alcohol and then mixed with 1 part by volume of water. As soon as the specific viscosity of the solution $$\left(\text{i.e. } \frac{\eta \text{ solution}}{\eta \text{ solvent}} - 1\right)$$

has increased approximately by the factor 10, the further condensation is stopped by an addition of 5% of ethyl glycol (ethylene glycol mono-ethyl ether).

After the belt has been coated with this solution, it passes again through a heating stage to dry the coating which is then severed from the belt in the form of scales or flakes by means of the devices as above described.

If scales or flakes with very intensive color effects are to be produced, it is advisable to pass the conveyor belt successively through three baths. The first and last of these baths produce coatings with a high refraction by means of solutions similar to that mentioned in Example 1, while the intermediate bath may contain a solution similar to that mentioned in Example 2 which results in a coating with a low refraction. After the belt has passed through the first two baths, the coatings are dried on the belt without being separated therefrom, while after passing through the third bath, the entire three-layer coating is severed from the belt in the form of flakes or scales in the manner as previously described.

The thickness of the coatings produced in the individual baths may be adjusted by varying the speed of movement of the belt and/or by varying the degree of concentration of the different solutions. Thus, due to the well known interference effect of single or multiple-layer coatings, the color and iridescence of the flakes may be varied within a wide latitude.

For increasing the gloss of the flakes to a still greater extent, it is advisable after removing them from the apparatus as described, to subject them to a further heat treatment at a higher temperature of about 400 to 600° C.

Although our invention has been illustrated and described with reference to the preferred embodiments thereof, we wish to have it understood that it is in no way limited to the details of such embodiments, or to the specific examples described, but is capable of numerous modifications within the scope of the appended claims.

Having thus fully disclosed our invention, what we claim is:

1. A process for producing fillers having an artificial pearly gloss which comprises coating a solid material support surface in the form of a flexible band with a liquid water containing solution of a hydrolyzable metallic compound of an at least trivalent metal, and converting the resulting liquid coating on said band into an oxide layer by dry heating in the absence of extraneous moisture, said band having a higher coefficient of thermal expansion than said oxide layer, and recovering the heated oxide layer in the form of dry flakes from the band.

2. A process according to claim 1 wherein said recovering includes imparting movements to said band to loosen the oxide layer therefrom, said movements being imparted by electrically controlled impulse vibrations operating at the frequency of an alternating current.

3. Process according to claim 1 wherein said band is an endless, flexible conveyor belt traveling in a continuous cycle first through a base bath for applying a base coating onto said belt adapted to reduce the adhesiveness of the oxide layer on said belt and adapted substantially to volatilize when heated and then through a base heating zone for solidifying said base coating, next through at least one bath containing said liquid solution to form a liquid coating over said base coating, and then through at least one oxide heating zone for converting said liquid coating into the oxide layer and for solidifying said layer, and next through a suction zone to separate by suction said heated oxide layer in the form of flakes from said belt, said flakes being collected, and finally through a cleaning zone for cleaning said belt completely, whereupon the cycle is repeated.

4. Process according to claim 3 wherein said belt travels successively through a plurality of baths containing oxide-forming solutions of different metallic compounds, and through an oxide heating zone subsequent to each of said baths for drying the coating last produced on the belt.

5. Process according to claim 1 wherein the oxide flakes recovered from the belt are subjected to a further heat treatment at higher temperatures for increasing the gloss of said flakes.

6. A process for producing fillers having an artificial pearly gloss which comprises coating a solid material support surface in the form of a flexible band with a liquid solution of a hydrolyzable metallic compound of an at least trivalent metal selected from the group consisting of antimony, tin, thorium, and mixtures thereof, converting the resulting liquid coating on said band into an oxide layer by heating, said band having a higher coefficient of thermal expansion than said oxide layer, and recovering the heated oxide layer in the form of dry flakes from the band.

7. A process for producing fillers having an artificial pearly gloss which comprises providing a solid material support surface in the form of a flexible band with a base coating, thereafter applying thereto a liquid solution of a hydrolyzable metallic compound of an at least trivalent metal, converting the resulting liquid coating on said band into an oxide layer by heating, said band having a higher coefficient of thermal expansion than said oxide layer, said base coating having the property of reducing the adhesiveness of the oxide layer on said band and adapted substantially to volatilize when heated, and recovering the heated oxide layer in the form of dry flakes from the band.

References Cited in the file of this patent
UNITED STATES PATENTS

| | | |
|---|---|---|
| 2,941,895 | Haslam | June 21, 1960 |
| 2,995,459 | Soloway | Aug. 8, 1961 |
| 3,008,844 | Grunin et al. | Nov. 14, 1961 |
| 3,071,482 | Miller | Jan. 1, 1963 |